United States Patent [19]

Driscoll

[11] 3,878,153

[45] Apr. 15, 1975

[54] PROCESS OF MIXING TWO ELASTOMERS

[75] Inventor: Richard E. Driscoll, Monroe, La.

[73] Assignee: Cities Service Company, New York, N.Y.

[22] Filed: Nov. 26, 1971

[21] Appl. No.: 202,588

[52] U.S. Cl. ...... 260/29.7 D; 260/5, 260/33.6 A, 260/42.55, 260/763, 260/888, 260/890, 260/894
[51] Int. Cl. .......................... C08d 7/00; C08d 9/08
[58] Field of Search ................ 260/29.7 D, 888, 894

[56] References Cited
UNITED STATES PATENTS

| | | | |
|---|---|---|---|
| 3,304,281 | 2/1967 | Tucker | 260/41.5 R |
| 3,491,052 | 1/1970 | Hare et al. | 260/41.5 R |

*Primary Examiner*—Melvyn I. Marquis
*Assistant Examiner*—H. H. Fletcher
*Attorney, Agent, or Firm*—Elton F. Gunn

[57] ABSTRACT

Homogeneous blends of elastomers are produced by mixing an elastomer in latex form with an elastomer dissolved in an organic solvent to form a pseudoemulsion in which the two elastomers are thoroughly mixed in the liquid phase. Both of the mixed elastomers are then coagulated and agglutinated to provide the blend. The latex is at least partially coagulated prior to coagulation of the dissolved elastomer. Subsequently the solvent is vaporized and removed from the pseudoemulsion to effect coagulation of the dissolved elastomer in the presence of elastomer from the latex which has already been coagulated, and the two elastomers are thus agglutinated.

10 Claims, No Drawings

PROCESS OF MIXING TWO ELASTOMERS

BACKGROUND OF THE INVENTION

The present invention is an improvement in the process disclosed in U.S. Pat. No. 3,491,052 entitled "Process for Compounding Elastomers" and assigned to the same assignee as this application. As is disclosed therein a homogeneous blend of elastomers may be produced by compounding an elastomer in latex form with an elastomer dissolved in a water immiscible organic solvent by thorough mixing in the liquid form, with vigorous agitation, to form a pseudoemulsion in which the elastomers are thoroughly compounded in the liquid phase. The mixed elastomers are thereafter agglutinated, simultaneously, by mixing the pseudoemulsion with a hot aqueous solution of a latex coagulating agent, e.g., an acid, at a temperature above the boiling point of the organic solvent of the dissolved elastomer, but below a temperature at which the water content of the pseudoemulsion is substantially vaporized. Accordingly, the solvent may be vaporized and separated from the presence of the elastomers, thus permitting the formation of a blended elastomer coagulum in the form of a wet rubber crumb. After coagulation, the solvent for the dissolved elastomer can be condensed, collected and reused while the wet rubber crumb is washed with fresh water, to remove impurities such as acids and soap residues, prior to drying.

To effect the aforementioned simultaneous vaporization of solvent coagulation of both elastomers, the pseudoemulsion must be exposed to sufficient heat and latex coagulating agent at the same time. The dissolved elastomer is the continuous phase of the pseudoemulsion so that the latex exists as droplets within the dissolved elastomer, and as a consequence the latex is to a large extent shielded from contact with the hot aqueous solution of the coagulating agent. In order to obtain thorough and effective coagulation and agglutination of the elastomers simultaneously, large quantities of the latex coagulating agent must oftentimes be employed lest coagulation of the latex elastomer be substantially incomplete, e.g. when sulfuric acid is employed as the coagulating agent it is frequently necessary to use amounts which provide a pH of about 1.0–1.5 during the coagulation step. While such is effective, it has the disadvantage of increasing corrosion of the process system, can be hazardous to the operator, and makes it difficult or impossible to incorporate rubber compounding ingredients which become soluble in water at low pH. Therefore, a method has been sought for coagulating and agglutinating the mixed elastomers of the pseudoemulsion at a higher pH while at the same time effecting substantially complete coagulation of the latex elastomer and providing a coagulum wherein the elastomers are thoroughly blended together.

SUMMARY OF THE INVENTION

In accordance with the present invention a latex and a dissolved elastomer are mixed to form a pseudoemulsion, the elastomer of the latex in the pseudoemulsion is at least partially coagulated prior to coagulation of the dissolved elastomer, the organic solvent is subsequently vaporized from the pseudoemulsion to coagulate the dissolved elastomer in the presence of elastomer from the latex which has already been coagulated, thereby agglutinating the two elastomers to provide a coagulum in which both are blended together. To advantage the elastomer of the latex can be creamed prior to the coagulation thereof. The latex can be partially coagulated prior to formation of the pseudoemulsion, but more preferably a latex coagulating agent is added to the pseudoemulsion at a temperature which permits at least partial coagulation of the latex elastomer prior to any substantial vaporization of solvent from the dissolved elastomer.

In accordance with prior processes, e.g. as described in U.S. Pat. Nos. 3,491,052 and 3,304,281, a mixture of latex and dissolved elastomer, i.e. a polymer solution, is mixed with a hot aqueous solution of latex coagulating agent at a temperature whereby coagulation of the dissolved elastomer and the latex elastomer take place at the same time and place. This is generally accomplished by mixing the pseudoemulsion with a heated, aqueous bath of the latex coagulating agent; and, as previously indicated the dissolved elastomer, or polymer solution, forms the continuous phase of the pseudoemulsion and thus shields the latex droplets, which are contained by the polymer solution, from contact with the aqueous solution of the coagulating agent.

In the present invention at least a portion of the latex coagulating agent can be thoroughly mixed into the pseudoemulsion before any substantial vaporization of solvent and consequent coagulation of the dissolved rubber, and since the coagulating agent is miscible in the aqueous or discontinuous phase of the pseudoemulsion, there is at least some coagulation in situ, i.e. there is a coagulation of the latex while it is still dispersed within the polymer cement, and hence prior to coagulation of the dissolved elastomer by vaporization of the organic solvent. Accordingly, the amount of coagulating agent required to coagulate the latex can be substantially reduced.

In preferred embodiments of the present invention the pseudoemulsion is introduced into and mixed with a hot water bath for complete coagulation and agglutination of the elastomers, but not until the elastomer of the latex has been at least partially coagulated beforehand. Within the hot water bath any unfinished coagulation of the latex is substantially completed, the dissolved elastomer is coagulated by vaporization of organic solvent, and the elastomers are thus agglutinated within the bath. Conveniently the hot water bath can have a latex coagulating agent dissolved within it and at least a portion of the solution can be recirculated and mixed with the pseudoemulsion for at least partial coagulation of the latex prior to introduction into the main body of the bath.

After coagulation and agglutination of the elastomers, the resulting coagulum can be separated from residual liquids, e.g. water, by filtering or screening, and it can be washed, if necessary, to remove excess coagulating agent, soaps, or soap residues. The coagulum can then be dried and baled by conventional means.

It will be understood that rubber compounding ingredients such as carbon black or oil can be incorporated into the elastomer blend either by mixture into the pseudoemulsion prior to coagulation of the elastomers or else subsequently by means of well-known dry mixing techniques.

DETAILED DESCRIPTION OF THE INVENTION

Reference herein to an elastomer dissolved in an organic solvent is intended to include either an elastomer solution per se or any such dissolved elastomer in which rubber compounding ingredients such as pigments and oils have been incorporated. Likewise, reference herein to an elastomer in the form of latex is intended to include the latex as such or a latex containing rubber pigments or other rubber compounding materials.

The term pseudoemulsion as used herein refers to an intimate blend of immiscible liquids such as may be formed by violent, short term mechanical agitation, or agitation which is less severe but of a much longer term, which results in sufficient shearing and disruption of the liquid streams to form droplets so that the immiscible liquids are very thoroughly commingled together. Without employing an emulsifying agent, such pseudoemulsions may exist for only a short period of time if not maintained under agitation, but it should be pointed out that emulsifying agents for stabilization of the pseudoemulsion are not essential, i.e., the pseudoemulsion may be subjected to coagulation very soon after formation and the pseudoemulsion may be subjected to sufficient agitation, between formation and coagulation, to prevent phase-separation of the immiscible liquid constituents.

It is frequently advantageous to employ sufficient turbulence and shear to cream the latex, either by mechanical agitation and/or through use of a creaming agent, prior to coagulation of the elastomer. Carbon black also functions as a creaming agent. Accordingly, the latex dispersion can be partially destabilized, i.e. creamed prior to actual coagulation of the elastomer.

Where it is desired to incorporate a pigment in the elastomer blend, e.g., carbon black, this can be effected with marked advantage, by dispersing the pigment in the pseudoemulsion prior to coagulation. Upon coagulation and agglutination as previously described, there is obtained a coagulum comprising a uniform blend of the elastomers having the pigment uniformly dispersed and bound therein. The pigment can also be dispersed in either one or both of the elastomers in liquid form prior to forming the pseudoemulsion.

Other compounding agents, for instance extender or softener oils, vulcanizing agents, antioxidants and stabilizers and the like can also be incorporated in the pseudoemulsion prior to the coagulation step so that dry-milling or mastication requirements are either eliminated or greatly reduced. If desired, the extender or processing oils may be predispersed in either one or both of the elastomer systems prior to forming the pseudoemulsion.

Elastomers which are available in either a dissolved form or which can be dissolved and used in accordance with this invention include polybutadiene, polyisoprene, polyisobutylene, butyl, chlorobutyl, polychloroprene, copolymers of butadiene, copolymers of isoprene, ethylene-propylene copolymers, natural rubber, acrylics, and, in fact any elastomer which may be dissolved in an organic solvent such as those described below.

The organic solvent constituent of the dissolved elastomer used in accordance with this invention may be either the monomer from which the elastomer was formed or any of the well-known commercial solvents, for instance hexane, heptane, benzene, ethers, and chloronated hydrocarbons, toluene, cyclohexane or the like in which the elastomer is soluble, and which is readily vaporized at temperatures to which the rubber constituents can be subjected without thermal degradation.

As the elastomer in latex form, one can use any elastomer which is emulsifiable in water including natural rubber, nitrile rubbers, acrylics, styrene-butadiene copolymers (SBR) and other synthetic rubbers, e.g. chloroprene or butadiene-acrylonitrile. However, the invention is especially useful in the blending of two or more elastomers at least one of which is directly or more economically available as an elastomer dissolved in an organic solvent and the other of which is directly or more economically available as an elastomer in latex form.

The invention can be used to particular advantage in the blending of the more recently developed stereospecific rubbers with a more conventional type of rubber. Such stereo-specific rubbers are alkene or olefin polymers produced through the use of highly specific catalyst resulting in polymers having a predetermined geometric arrangement of molecules. These polymers are produced by solution polymerization, the monomeric substance being dissolved in an inert organic liquid, such as a saturated hydrocarbon. Polymers of this type include cis-1,4 polybutadiene, trans-1,4 polybutadiene, cis-1,4 polyisoprene, ethylene-propylene and a rubber marketed under the trade name "Diene" and composed of 1,2-polybutadiene, trans-1,4 polybutadiene and cis-1,4 polybutadiene contained in the same polymer chain.

In place of carbon black, other pigmentary reinforcing agents or fillers may be used, for instance silica, titania or the like, depending upon the desired properties of the resultant elastomer compound. For rubber reinforcement, carbon black is generally preferred and the invention is not restricted as to the grade of carbon black used, the choice of type depending primarily on the properties desired in the finished rubber product.

A further advantage of our invention is that either unpigmented homogeneous blends of elastomers or rubber-carbon black masterbatches containing a blend of elastomers can be formed by mixing and agglutinating the ingredients in liquid phase without the use of chemical stabilizers, emulsifiers, dispersing agents and the like. Adequate mixing, dispersion, and homogenization can be accomplished by means which impart hydraulic turbulence and shearing forces to the fluid constituents involved in the blending operation.

In forming black-rubber masterbatches containing a blend of elastomers, an aqueous dispersion of carbon black particles can be incorporated into the pseudoemulsion so that the immiscible droplets containing the respective elastomers are intimately commingled with the dispersed carbon black in such a way that the particles are transferred from their aqueous dispersion medium to each respective elastomer without substantial reagglomeration of the carbon particles. Such compounding of the elastomers and pigment in the liquid phase favors intimate contact between the carbon particles and the elastomers. Further, intimate pigment-elastomer contact is favored by the low viscosity inherent in the liquid phase compounding systems employed with this invention.

As previously indicated, the latex in the pseudoemulsion is at least partially coagulated prior to coagulation of the dissolved elastomer. The extent to which the latex is thus coagulated is dependent upon the amount of coagulating agent introduced, and can be varied to control the crumb size of the agglutinated elastomer coagulum, but care should be taken to protect against plugging of pipelines as would disrupt the operation when such preliminary coagulation of the latex is relatively complete. It is therefore generally desirable to partially coagulate the latex, then dilute the pseudoemulsion with a large amount of water upon further coagulation of the latex and removal of solvent from the dissolved elastomer. Conveniently the water with which the pseudoemulsion is diluted can be heated to a temperature which results in substantially complete vaporization of the solvent of the dissolved elastomer, and the water should also contain sufficient coagulating agent to finish off coagulation of the latex.

Any suitable coagulation agent can be employed for coagulating the elastomer of the latex, e.g. mineral acids, organic acids, alum and mixtures thereof. Sulfuric acid can usually be employed to advantage. Sufficient agitation should be employed when incorporating the coagulating agent in the pseudoemulsion to assure thorough distribution of the agent throughout the pseudoemulsion, and more particularly throughout the aqueous or discontinuous phase which contains the latex. The latex coagulating agent can thus be added to the pseudoemulsion while accompanied or followed by severe agitation. The coagulating agent and the pseudoemulsion can, for instance, be thoroughly intermixed using an eductor or ejector as a mixer. The effluent from the mixer can then be heated to vaporize the organic solvent, accompanied by exposure to still more latex coagulating if necessary, coagulating the dissolved elastomer as well as any remaining latex, and thus agglutinating the two elastomers. In preferred embodiments the effluent from the mixer is introduced into a hot water bath for vaporization of the solvent, the water bath contains the latex coagulating agent, and a portion of the liquid of the bath is recycled and mixed with the pseudoemulsion before it is introduced into the main body of the bath.

The amount and type of latex coagulation employed in the present invention is subject to considerable variation depending upon the type of elastomers being coagulated, the nature of the crumb derived in the coagulum, and the like. It will also be appreciated that the amount of coagulating agent required will depend upon the type employed. In any case the optimum type and amount which should be used in any given case can be readily determined through a few simple experiments conducted by one skilled in the art and using the present disclosure as a guideline.

The invention will now be further described with reference to apparatus especially adapted to carrying out the process, and more particularly that aspect of the invention in which rubber-carbon black masterbatches are formed from an aqueous carbon black slurry, an emulsified elastomer, and a dissolved elastomer.

Water is charged to a mixing funnel while carbon black is charged to the mixing funnel through a metering conveyor. From the mixing funnel, the water and carbon black pass to a centrifugal pump and are therein primarily mixed and charged to a disperser wherein aggregates of the carbon black are broken up. The carbon black is thus uniformly dispersed in the water to form a flowing stream of carbon black slurry which passes from the downstream end of the disperser.

The carbon black slurry which is discharged from the disperser is fed into a colloid mill as is also a stream of latex. A thoroughly mixed stream of carbon black and latex, herein designated "carbex," is passed from the colloid mill to a second mixer and thence to a third mixer. An elastomer solution having a rubber compounding oil dissolved therein is also fed to the third mixer. The carbex and the elastomer solution are thoroughly homogenized and formed into a pseudoemulsion in the third mixer by violent turbulence. Upon leaving the third mixer the discharged pseudoemulsion comprising the carbex, dissolved elastomer in solvent, and water is introduced into a bath of hot water held within a large, closed tank. Sufficient coagulating agent is contained within the water to coagulate the elastomer of the latex and the water is heated to a temperature sufficient to vaporize the solvent of the dissolved elastomer. However, before the pseudoemulsion is introduced into the tank, it is first thoroughly mixed with a portion of the water bath which is withdrawn from the tank and circulated to the third mixer into which the carbex and elastomer solution are also fed. Conditions of temperature and pressure at the third mixer are such that no substantial vaporization of the organic solvent occurs, e.g. the hot water containing the coagulating agent which is withdrawn from the tank and circulated to the mixer does not have sufficient heat content for this purpose. However, coagulation of the latex begins at or shortly beyond the third mixer and the pseudoemulsion is then passed quickly into the water bath within the tank. Coagulation of the latex continues and proceeds substantially to completion within the bath. Coagulation of the dissolved elastomer commences and proceeds to completion within the hot water bath also, and the coagula of the two elastomers become agglutinated therein to provide a blend of the elastomers in the form of wet crumbs suspended in the water. These crumbs also contain practically all of the carbon black and oil incorporated into the pseudoemulsion during the liquid phase mixing steps.

Organic solvent in the dissolved rubber is vaporized by heat supplied to the water tank by any convenient means such as direct injection of steam and a stream containing water, organic solvent vapor, and rubber crumb is discharged from the tank. The organic vapor is separated from the tank effluent and passed to a solvent recovery system. Water and rubber crumb are conveyed to a washer and filter whereby the crumb is washed to remove soap residues and filtered to remove most of the water. The washed and filtered crumb is dried by conventional means and may then be baled or processed in any conventional manner. All or a portion of water separated from the black-rubber crumb in the washer and filter may be discharged or recycled to the tank and/or the third mixer.

When an extending or processing oil is to be compounded with the rubber employed in latex form, it can be fed at a proportioned rate into the colloid mill along with the latex, whereby the oil, latex, and carbon black are thoroughly homogenized therein.

When an extending or processing oil is to be compounded with the rubber employed in a dissolved state, it can be dissolved in the elastomer solution before the latter is passed into the third mixer.

For the previously noted mixers fluid injectors can be employed, but mixing nozzles or other apparatus can also be used whereby fluid streams are disrupted and thoroughly mixed together. As previously indicated a colloid mill can be used for the purpose and a mixer as described in U.S. Pat. No. 2,972,473 can be used to advantage.

The concentration of the respective elastomers in their liquid vehicles is not critical. For convenience in carrying out the operation, an elastomer solution of about 5 to about 30 weight percent of rubber and a latex of about 5 to 40 weight percent of rubber are presently preferred. However, more dilute concentrations can be successfully used in accordance with our invention as can also higher concentrations, provided the latter are not too viscous and can be readily mixed with the latex and/or the carbon black slurry.

The proportion of carbon black used may range upwardly to higher than 150 parts of carbon black per 100 parts of rubber. The preferred proportion of carbon black, particularly for tire tread use, is usually within the range of 30–80 parts of carbon black per 100 parts of rubber solid derived from the latex and 40–100 parts of carbon black per 100 parts of rubber solid derived from the elastomer solution.

The process of the present invention will be further illustrated by means of the following specific examples.

EXAMPLE 1

A crude carbon black slurry was formed by passing carbon black pellets and water into a centrifugal pump at rates of 52.5 Kg./hr. and 1250.0 Kg./hr., respectively. On leaving the pump the crude slurry was passed through a dispersing apparatus wherein the carbon black pellets were broken up and the carbon black particles thoroughly dispersed in the water. After leaving the disperser, the slurry was mixed with 218 Kg./hr. of an SBR latex having a rubber solids content of 22.5 weight percent, and the resulting mixture was then passed through a colloid mill and thence through a second mixer whereby the carbon black was further dispersed, a carbex was formed, and the latex was creamed.

The dissolved elastomer was polybutadiene in toluene to form a cement which was 12.6 percent by weight of the rubber. An aromatic extending and plasticizing oil was also dissolved in the cement to provide 1.68 Kg. of the oil therein for each Kg. of the rubber.

The cement containing the polybutadiene and oil was fed to a steam eductor at the rate of 202.20 Kg./hr. while the carbex was also fed to the eductor at the rate of 1530.50 Kg./hr. Steam was supplied to the eductor at a rate which furnished an eductor inlet pressure of 0.2 Kg./cm$^2$. The effluent from the ejector was introduced directly into a tank which held approximately 2,000 liters of hot water maintained at 97°C. by direct injection of steam into the tank. The pH of the hot water was maintained at about 3.2 by addition of sulfuric acid. During the operation, acidified water was circulated from the tank to the eductor at the rate of 0.4m$^3$/hr. and was thoroughly mixed with the pseudoemulsion in the eductor. Partial coagulation of the elastomer of the latex occurred upon mixture with the acidified hot water at the eductor and during transit to the tank. Coagulation of both elastomers was completed in the tank and the coagula became agglutinated to provide a wet-crumb rubber having an average diameter of 2.4 mm.

The toluene vapor released during coagulation of the elastomers was removed from the tank, condensed, and recovered for dissolving more polybutadiene. Rubber crumb having the carbon black and oil dispersed therein was separated from the acidifed hot water and was then extrusion dried for removal of water and residual acid from the masterbatch.

A portion of the acidified hot water separated from the rubber crumb, i.e. about 1 to 2 m.$^3$/hr. was recirculated to the tank separately from that added to the pseudoemulsion at the eductor. Accumulation was disposed of as waste.

Yield determinations revealed that essentially all of the rubber, oil and carbon black introduced into the tank was effectively formed into crumb. Examination of the crumb revealed that the rubbers and oil were thoroughly blended together, with the carbon black being discretely dispersed throughout the blend.

The present example must be considered in view of a preceding experiment which was essentially identical except that none of the acidified hot water was circulated from the tank to the eductor for partial coagulation of the latex prior to introduction of the pseudoemulsion into the acidified hot water in the tank. In that case it was necessary to maintain the pH of the acidified hot water at about 1.0 in order to completely coagulate the latex.

EXAMPLE 2

Example 1 was repeated except that the weight ratio of water to carbon black in the aqueous carbon black slurry was varied over the range of 96/4 to 90/10. It was found that decreasing this ratio resulted in (1) an increase in the extent to which the latex was creamed, (2) an increase in the crumb size of the coagulum produced in the tank, and (3) an increase in the tackiness of the crumbs.

EXAMPLE 3

Example 1 was repeated except that the amount of acidified hot water circulated to the eductor for mixture with the pseudoemulsion was increased from 0.40 m.$^3$/hr. to 0.80 m$^3$/hr. and then to 1.60 m$^3$/hr. Increasing the circulation rate to 0.80 m$^3$/hr. increased the average crumb size to 2.7 mm. from 2.4 mm. and increased the elastomer loss only very slightly from 0.33 Kg./hr. to 0.58 Kg./hr. Increasing the circulation rate of the acidified hot water to 1.60 m$^3$/hr. gave an average crumb size of 2.2 mm. and an elastomer loss of 1.4 Kg/hr.

EXAMPLE 4

Example 1 was repeated except that the steam pressure to the mixing eductor was varied over the range of 0.2 Kg./cm$^2$ to 0.8 Kg./cm$^2$. It was found that crumb size of the coagulum decreased from 2.3 mm. at 0.2 Kg./cm$^2$ to 1.8 mm. at 0.8 Kg./cm$^2$. Elastomer loss also increased from 0.32 Kg./hr. at the lower pressure to 0.95 Kg./hr. at the higher pressure.

Although the present invention has been described with reference to specific compositions, process conditions, materials, apparatus and the like, it will nonetheless be understood that other embodiments and modifications will become apparent which are within the spirit and scope of the invention as defined in the following claims.

Therefore, what is claimed is:

1. In a process for producing a homogeneous blend of elastomers by mixing an elastomer in latex form with an elastomer dissolved in a water immiscible organic solvent to form a pseudoemulsion in which the two elastomers are mixed in the liquid phase and both of the mixed elastomers are then coagulated and agglutinated to provide a blend of the two elastomers, the improved method which comprises the following steps:
 a. mixing a latex coagulating agent into the aqueous phase of said pseudoemulsion and partially coagulating the elastomer of the latex prior to substantial vaporization of said solvent and hence prior to coagulation of the dissolved elastomer,
 b. introducing the pseudoemulsion following step (a) into a hot water bath which contains a latex coagulating agent, vaporizing said organic solvent, coagulating the dissolved elastomer and also the elastomer of the latex which remains uncoagulated following step (a), the dissolved elastomer being coagulated in the presence of coagulated latex elastomer produced during step (a), and thus agglutinating the two elastomers.

2. The process of claim 1 wherein the elastomer of the latex is creamed prior to the coagulation thereof.

3. The process of claim 1 wherein a portion of said hot water bath which contains a latex coagulating agent is circulated and mixed with the pseudoemulsion before it is introduced into the main body of the bath.

4. The process of claim 1 wherein the coagulating agent is sulfuric acid.

5. The process of claim 1 wherein a latex coagulating agent is added to the pseudoemulsion, the latex elastomer is partially coagulated during step (a), the resulting mixture is then diluted with a hot aqueous solution of the latex coagulating agent, organic solvent is vaporized from the dissolved elastomer, the dissolved elastomer is coagulated accompanied by further coagulation of the elastomer of the latex, and the two elastomers are thus agglutinated.

6. The process of claim 1 wherein a rubber pigment is incorporated in the pseudoemulsion and is bound within the coagulum upon agglutination of the elastomers.

7. The process of claim 6 wherein the rubber pigment is carbon black.

8. The process of claim 1 wherein a rubber compounding oil is incorporated in the pseudoemulsion and is bound within the coagulum upon agglutination of the elastomers.

9. The process of claim 1 wherein the elastomer in the form of a latex is a styrene-butadiene copolymer rubber.

10. The process of claim 1 wherein the elastomer dissolved in an organic solvent is a stereo-specific rubber.

* * * * *